United States Patent [19]
Allen

[11] 3,952,145

[45] Apr. 20, 1976

[54] PICKUP ARM CARTRIDGE APPARATUS

[75] Inventor: James Austin Allen, Monrovia, Ind.

[73] Assignee: RCA Corporation, New York, N.Y.

[22] Filed: Nov. 12, 1974

[21] Appl. No.: 522,821

[52] U.S. Cl.................... 178/6.6 R; 179/100.41 G; 274/37
[51] Int. Cl.².................. H04N 5/76; G11B 3/08
[58] Field of Search........ 178/6.6 R, 6.6 A, 6.6 DD, 178/6.6 P; 179/100.1 B, 100.4 R, 100.4 M, 100.41 R, 100.41 S, 100.41 G; 274/23 R, 23 A, 37; 360/77, 78, 86, 97, 99, 104, 105, 106

[56] References Cited
UNITED STATES PATENTS

| | | | |
|---|---|---|---|
| 2,988,366 | 6/1961 | Hansen | 274/37 |
| 3,245,084 | 4/1966 | Kuyt | 274/37 |
| 3,495,838 | 2/1970 | Zimmermann | 274/37 |
| 3,843,846 | 10/1974 | Miller | 179/100.4 M |
| 3,872,240 | 3/1975 | Carlson | 178/6.6 R |
| 3,873,762 | 3/1975 | Taylor | 178/6.6 A |
| 3,873,783 | 3/1975 | Leedom | 179/100.4 R |
| 3,882,267 | 5/1975 | Leedom | 274/23 A |

Primary Examiner—Raymond F. Carbillo, Jr.
Attorney, Agent, or Firm—Eugene M. Whitacre; William H. Meagher; Dilip A. Kulkarni

[57] ABSTRACT

A cartridge casing houses a fragile pickup arm unit of a video disc record player to, (1) protect the pickup arm unit during storage and handling, and (2) facilitate ready replacement of the pickup arm unit without need for any connections and adjustments. The pickup arm unit comprises a pickup arm carrying a signal pickup at one end and having its second end secured to a coupler by a compliant pickup arm support. The pickup arm unit is suspended at the second end within the casing by a pair of tabs secured to the coupler and extending therefrom for reception in a pair of openings provided in the casing. A clamp pivotally mounted in the casing engages the pickup arm to securely hold the signal pickup end of the pickup arm unit in a retracted position in the casing when the cartridge is in an unassembled condition. A finger mounted in the player supporting structure engages and disables the clamp during assembly of the cartridge in the player to free the pickup arm for engagement with a signal pickup lowering/lifting mechanism mounted in the supporting structure.

13 Claims, 6 Drawing Figures

PICKUP ARM CARTRIDGE APPARATUS

The present invention relates to an improved cartridge for housing a delicate pickup arm unit of a disc record player.

BACKGROUND OF THE INVENTION

In certain video disc systems, video information is recorded by means of geometric variations in the bottom of a smooth spiral groove on the surface of a disc record. The disc record surface includes a coating of conductive material which is preferably covered with a thin deposit of dielectric material. A signal pickup, supported by a pickup arm, engages the spiral groove and includes a conductive electrode which establishes a capacitance with the conductive coating and the dielectric deposit of the disc record. When the disc record is rotated, the electrode/disc capacitance varies in response to the geometric variations in the bottom of the spiral groove passing beneath. The capacitance variations are converted to electrical variations by a suitable signal processing circuitry coupled to the signal pickup electrode. The output signal of the signal processing circuitry may be coupled to a conventional television receiver for reproduction. The other end of the pickup arm is releasably secured by a coupler to a support member of a supporting structure of the playback system. A system of the aforementioned type is described in detail in the U.S. Pat. No. 3,842,194, issued on Oct. 15, 1974, to J. K. Clemens.

Video disc systems of the aforementioned type generally utilize disc records having groove densities in the order of four to eight thousand groove convolutions per inch. A typical video disc record of this type may have a groove convolution spacing in the order of 3.5 microns. The fragile walls of relatively narrow grooves of the disc record cannot be dependably relied upon to pull the weight of the pickup arm assembly, around the pickup arm pivot support, across the entire recorded surface of the disc record. Also, in video disc systems utilizing the variable capacitor concept, it is desirable for accurate reproduction of the prerecorded signals that the signal pickup electrode maintain a substantially constant attitude in the spiral groove. Stated differently, the position and the angular orientation of the signal pickup electrode in relation to the information track in the spiral groove must be held relatively constant. Therefore, the supporting structure includes a radial feed drive mechanism for traversing the supported end of the pickup arm in proper time relationship with the radial motion of the signal pickup tip engaged in the spiral groove so as to continuously maintain the longitudinal axis of the pickup arm substantially tangential to the spiral groove at the point of engagement. Reference may be made to the copending U.S. Application of F. R. Stave, Ser. No. 351,600, filed Apr. 16, 1973, entitled "VIDEO DISC PLAYBACK APPARATUS", and now U.S. Pat. No. 3,870,835, for an illustration of a suitable radial feed drive mechanism for providing the indicated radial motion.

Further, in the above-mentioned type video disc systems, it has been recognized that the relative motion between the disc record and the signal pickup must be maintained at a predetermined speed, and within specified tolerance limits (e.g., 450 rpm, ±0.01 percent), in order to obtain high fidelity of reproduction of the prerecorded signals. The predetermined speed and the specified tolerance limits are also necessary to assure that the horizontal and vertical synchronizing information is stable and within the lockup range of the deflection circuits of the television receiver. Moreover, when the prerecorded information is a color television signal with chrominance information recorded as a modulated carrier signal, the recovered signal must be stable and within the lockup range of the color processing circuits of the playback system in order to reduce color phase distortion.

The disc record/signal pickup relative speed may be maintained at the predetermined speed, and within the specified tolerance limits by rendering the pickup arm support member subject to cyclical, translatory motion along the longitudinal axis of the pickup arm in a manner that opposes deviations of the instantaneous relative speed from the predetermined speed. Illustratively, the means for imparting translatory motion to the support member may be of the type disclosed in the U.S. Pat. No. 3,711,641, issued to R. C. Palmer on Jan. 16, 1973, entitled "VELOCITY ADJUSTING SYSTEM".

Additionally, in an advantageous pickup arrangement for video disc systems of the aforementioned type, the pickup arm is made of conductive material and is enclosed in a conductive cage. The conductive pickup arm and the surrounding conductive cage serve respectively as an inner and outer conductor of an electrical transmission line. The transmission line is capacity end loaded at the pickup arm supported end by a series combination of capacitances which include an air dielectric capacitor and a voltage variable capacitor (for tuning purposes). The transmission line is also capacitor end loaded at the signal pickup end by a combination of capacitances which include the signal pickup electrode/disc record conductive coating variable capacitance. The transmission line and associated capacitances form a tuned circuit with a resonant frequency subject to variations as the signal pickup electrode/disc conductive coating capacitance varies. The tuned circuit is excited with UHF oscillations from a fixed frequency oscillator of the signal processing circuitry operating at a frequency (e.g., 915 MHz) within an ISM-allocated band. As the resonant frequency of the tuned circuit varies, the resultant UHF oscillation amplitude variations are detected by the signal processing circuitry detector to recover the prerecorded information. Reference may be made to the copending U.S. application of D. J. Carlson, et al., Ser. No. 451,103, filed Mar. 14, 1974, entitled "PICKUP APPARATUS FOR VIDEO DISC PLAYERS", and now U.S. Pat. No. 3,872,240, for a more detailed description of the aforesaid transmission line arrangement and the associated circuitry.

In playback systems of the aforementioned type, the following considerations may be encountered. First, groove-engaging and low mass requirements of such a typical signal pickup apparatus utilized in the above-mentioned systems result in a pickup arm unit which is extremely fragile (e.g., signal pickup width 2 microns, signal pickup depth 5 microns, signal pickup electrode width 2 microns, and signal pickup electrode depth 0.2 microns). Therefore, it is desirable to protect the pickup arm unit.

Second, the signal pickup must maintain the specified attitude in the spiral groove during playback in order to preclude undesirable variations (i.e., not representative of prerecorded signals in the information track) in signal pickup electrode/disc record conductive coating capacitance. Therefore, it is desirable to facilitate replacement of the miniature signal pickup electrode (e.g., electrode width 2 microns, and electrode depth 0.2 microns) without need for any manual, electrode attitude adjustments.

Third, the conductive pickup arm, electrically connected to the signal pickup electrode, and the signal pickup may desirably be treated as a replaceable unit of a size convenient to handle, whereby when the signal pickup wear calls for a replacement, the player user may readily remove and replace the pickup arm unit without requirements for mechanical skill and manual dexterity. A replaceable unit arrangement may be desirable for several reasons. One, the replacement of the pickup arm/signal pickup unit would require no electrical wiring disconnections and connections between the signal pickup electrode and the conductive pickup arm. Two, achievement of a proper attitude for the signal pickup in its playing position may readily be established, and not left to dependence on the skill and knowledge of the user during replacement. Three, the replacement of the fragile and miniature signal pickup (e.g., the signal pickup width 2 microns, the signal pickup depth 5 microns, and the signal pickup electrode depth 0.2 microns) would be rendered more practicable.

Fourth, it would be also desirable to facilitate replacement of the pickup arm unit without need for any manual, complicated disconnection and connection between the pickup arm unit and the translatory motion imparting means, whereby unskilled consumer replacement of a replaceable unit becomes more feasible.

In a copending U.S. application of M. A. Leedom, Ser. No. 522,815, filed concurrently, and entitled "PICKUP ARM CARTRIDGE", and assigned to the present assignee, a replaceable cartridge arrangement is described. In the Leedom arrangement, the pickup arm coupler is suspended in the cartridge casing by an elastic diaphragm. The elastic diaphragm maintains angular orientation of the signal pickup while permitting arcuate and translatory motion of the pickup arm unit throughout playback. Further, a leaf spring is utilized for securing the pickup arm unit in the casing during storage and handling of the cartridge. The leaf spring also serves to lower the pickup arm so that the signal pickup may ride in the spiral groove.

In another copending application of B. K. Taylor, et al., Ser. No. 522,822, filed concurrently, entitled "DETACHABLE PICKUP ARM MAGNETIC COUPLING", and also assigned to the present assignee, an arrangement for orienting and detachably coupling the pickup arm unit coupler with the translatory motion imparting means support member is described.

The present invention is concerned with a modification of the pickup arm cartridge and the detachable pickup arm magnetic coupling of the general form described, in the aforesaid, respectively, Leedom and Taylor, et al., applications to provide a pickup arm cartridge apparatus of a modified form. The present invention provides novel means which suspend the pickup arm unit within the casing during storage and handling of the cartridge while not interfering with the pickup arm unit arcuate and translatory motion during playback. The present invention further provides novel means for disabling the clamping means (which securely hold the pickup arm unit in the casing) during assembly of the cartridge in the player. Separate means are provided in the associated player for carefully lowering the pickup arm for engagement of the signal pickup with the spiral groove.

SUMMARY OF THE INVENTION

A cartridge casing houses a pickup arm unit of a disc record player. The pickup arm unit comprises a pickup arm carrying a signal pickup at one end and having its second end secured to a coupler by a compliant pickup arm support. The coupler is subject to releasable engagement with a translatory motion imparting means support member of the player supporting structure for varying the position of the signal pickup in relation to a disc record spiral groove in a manner that opposes deviations of the signal pickup/spiral groove relative speed from a predetermined speed. The coupler/support member engagement rigidly transmits the translatory motion of the support member to the pickup arm. Guide means are provided for initially steering and then maintaining the coupler angular orientation with respect to the support member thereby disposing the pickup in signal transfer relation with the spiral groove during playback. The pickup arm unit is suspended at the second end within the casing by a plurality of tabs secured to the coupler and extending therefrom for reception in a plurality of openings provided in the casing. The openings are dimensioned to accommodate the translatory motion of the coupler without engagement between the tabs and the casing during playback when the cartridge is in an assembled condition. Clamping means securely hold the signal pickup end of the pickup arm unit in a retracted position in the casing when the cartridge is not in the assembled condition. Means mounted on the supporting structure disable the clamping means during assembly of the cartridge in the player to free the pickup arm for engagement with signal pickup lowering/lifting means also mounted in the supporting structure.

BRIEF DESCRIPTION OF THE DRAWINGS

Other objects, features, and advantages of the present invention will be more fully understood from the following detailed description of the preferred embodiment, the appended claims and accompanying drawings in which:

DETAILED DESCRIPTION OF THE PREFERRED EMBODIMENT

Figure 1:
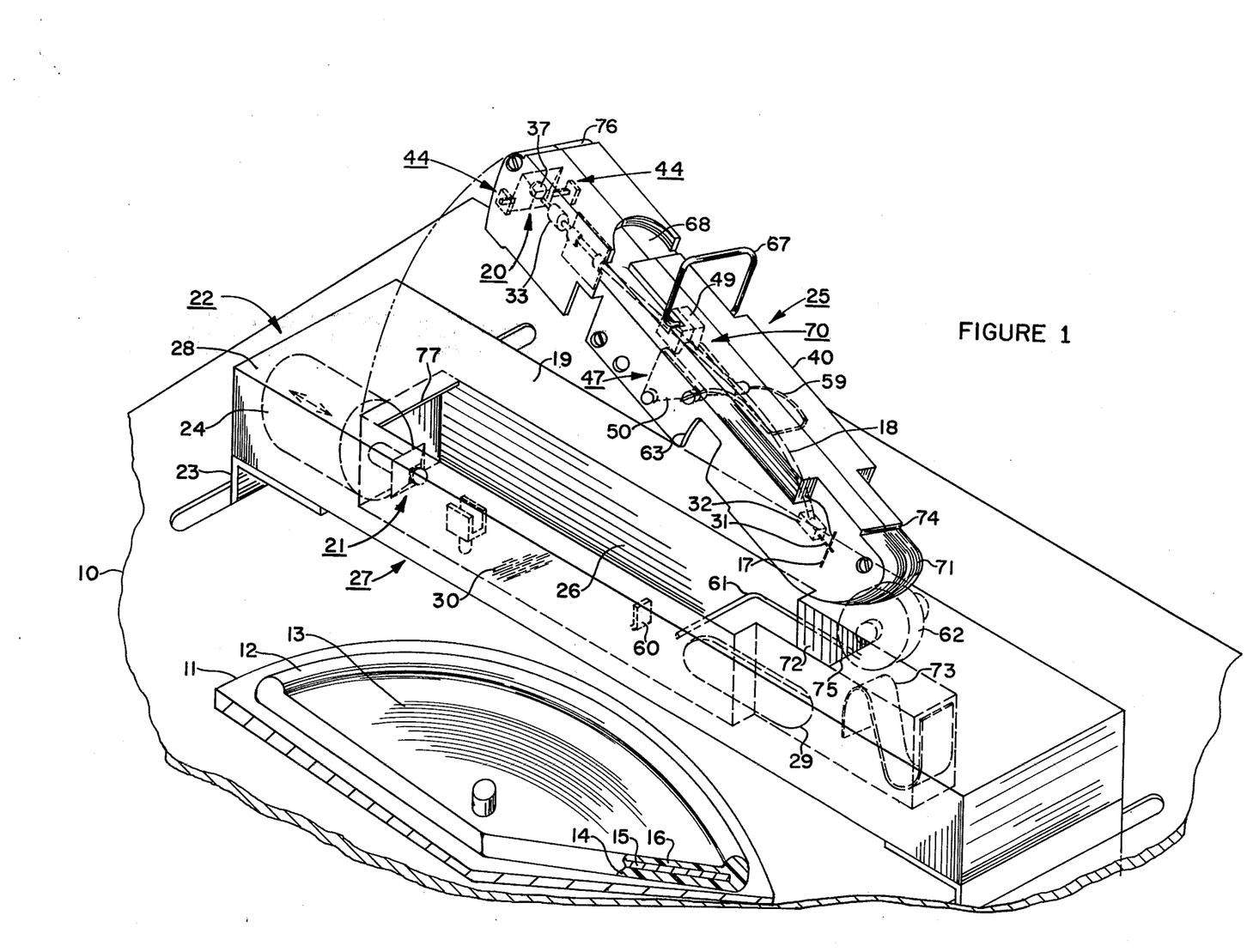
FIG. 1 is a partially cut-away perspective view of a video disc player incorporating an embodiment of the present invention and illustrating a pickup arm cartridge apparatus about to be assembled in the player supporting structure.
Figure 2:
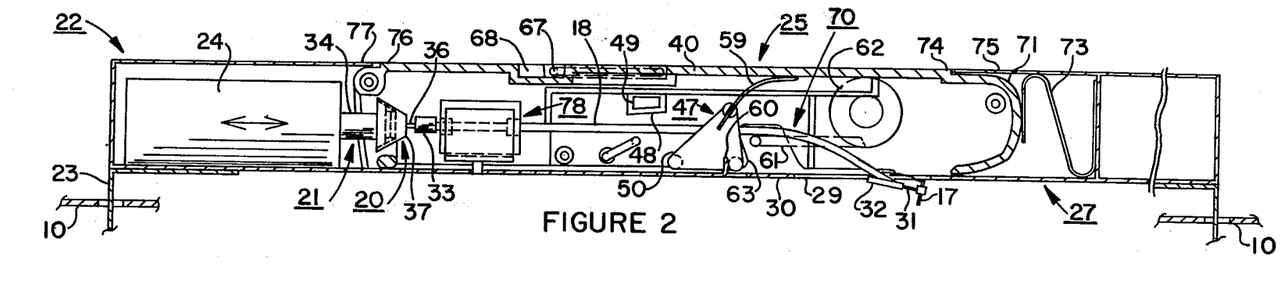
FIG. 2 is a partially sectioned side view of the pickup arm cartridge of FIG. 1 assembled in the player supporting structure.
Figure 3:
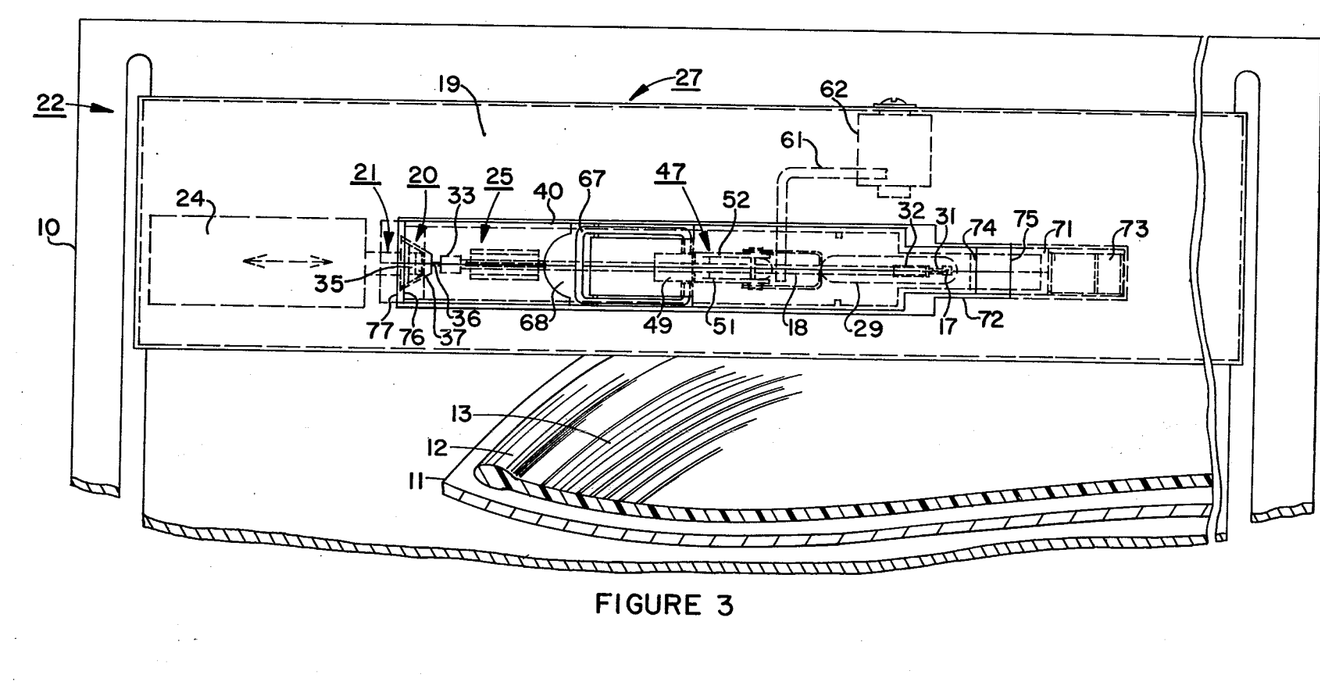
FIG. 3 is a top view of the player of FIG. 1 with the pickup arm cartridge shown in the assembled condition.

Referring to FIGS. 1, 2, and 3, wherein like reference numerals designate similar elements in the various views, a video disc player is shown having a turntable mounting plate 10. The player is suitable for use in a video disc system such as disclosed in the aforementioned Clemens' patent. A turntable 11 is rotatably mounted on the turntable mounting plate 10. The upper surface of the turntable 11 is adapted to support a video disc record 12. Video information is recorded by means of geometrical variations in the bottom of a smooth spiral groove 13 on the substrate 14 of the disc record 12. The disc record 12 surface includes a conductive coating 15 which is preferably covered with a thin deposit 16 of dielectric material. Although the disc record 12 is shown to have recording on one side only for the purposes of simplicity, it will be seen that the disc record may as well have recording on both sides. A signal pickup 17, supported by a pickup arm 18, engages the spiral groove 13 and includes a conductive electrode (not shown) which, together with the conductive coating 15 and the dielectric deposit 16, form a capacitor. When relative motion is established between the signal pickup 17 and the disc record 12, an edge of the electrode included in the signal pickup, while riding in the spiral groove 13, serves as an electrode of a capacitor varying due to the geometric variations in the bottom of a smooth spiral groove passing underneath. The other end of the pickup arm 18 is releasably secured by a coupler 20 to a support member 21 carried by a pickup arm supporting structure 22 in the manner to be described subsequently.

The pickup arm supporting structure 22 comprises a radial feed drive mechanism 23 and a translatory motion imparting means 24. As indicated before, the radial feed drive mechanism 23 traverses the pickup arm support member 21 in proper time relationship with the radial motion of the signal pickup 17 tip engaged in the spiral groove 13 so as to continuously maintain the longitudinal axis of the pickup arm substantially tangential to the spiral groove at the point of engagement. Reference may be made to the aforementioned copending Stave application (U.S. Pat. No. 3,870,835) for an illustration of a suitable feed drive mechanism for providing the indicated radial motion.

As noted above, the translatory motion imparting means (also known as "armstretcher") varies the position of the signal pickup along the disc record spiral groove 13 by imparting cyclical, translatory motion to the pickup arm along its longitudinal axis, via the support member 21, in a manner that opposes deviations of instantaneous relative speed from a predetermined speed. Illustratively, the translatory motion imparting means may be of the abovementioned Palmer type (U.S. Pat. No. 3,711,641).

A pickup arm cartridge 25, which houses a pickup arm unit 70 in the manner to be described subsequently, is received in a compartment 26 of a box-like conductive cage 27 which is mounted on the radial feed drive mechanism 23. The translatory motion imparting means 24 is enclosed in a compartment 28 provided in the box-like cage 27. The cage 27 is reciprocably supported at both ends thereof in order to provide a more rigid construction for the disc record player. During playback the pickup arm 18 passes through an opening 29 in the bottom wall 30 of the cage 27 for permitting the signal pickup 17 to ride in the spiral groove 13.

Figures 4, 5, 6:
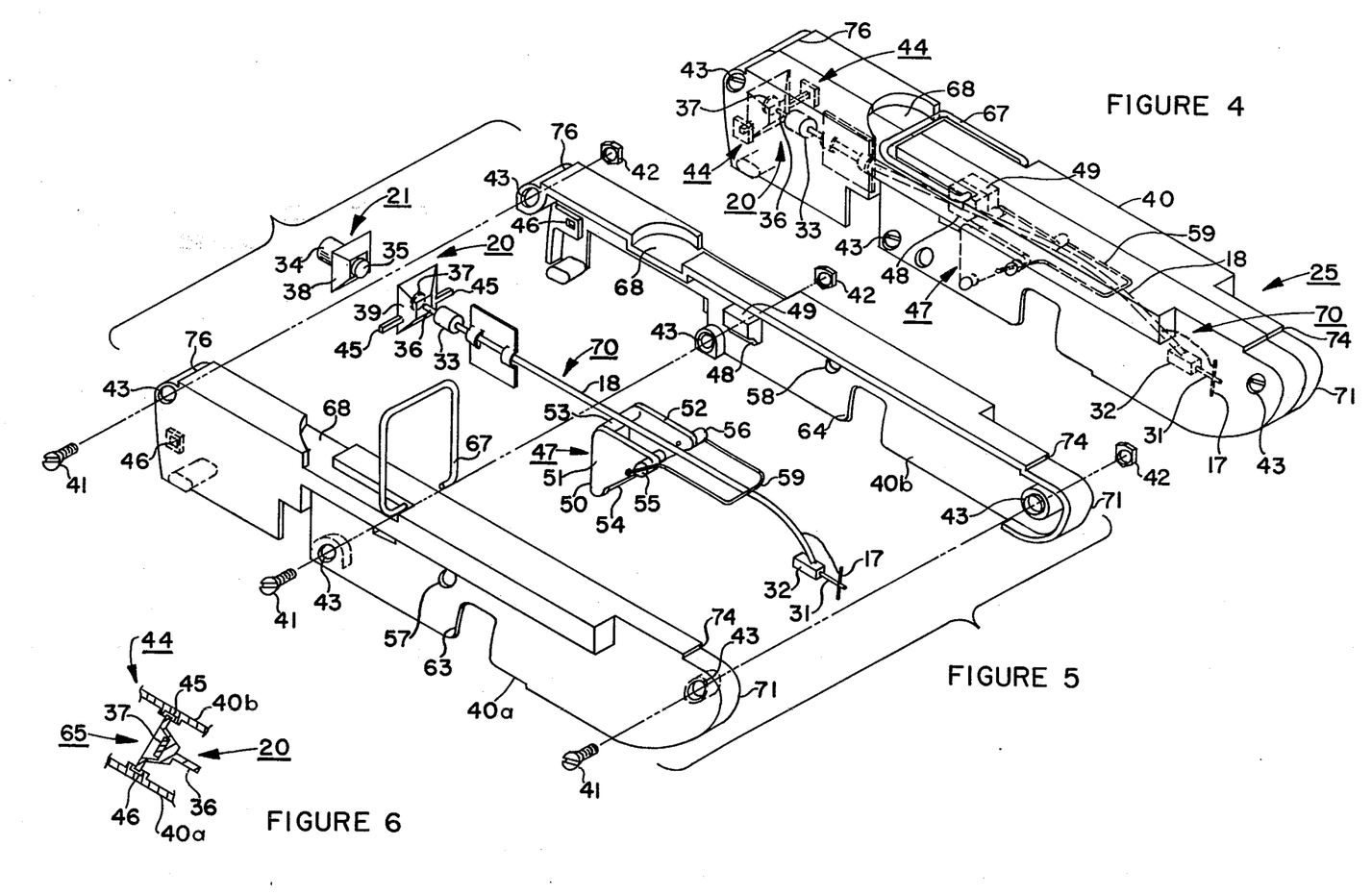
FIG. 4 is a perspective view of the pickup arm cartridge of FIGS. 1, 2, and 3.
FIG. 5 is an exploded, perspective view of the pickup arm cartridge of FIGS. 1, 2, 3, and 4.
FIG. 6 illustrates construction details of the means utilized for suspending the pickup arm coupler in the cartridge casing.

Referring now to FIGS. 4 and 5, illustratively the replaceable pickup arm unit 70 may comprise a signal pickup holder 31 (carrying the signal pickup 17) pivoted by a compliant signal pickup holder support 32 to the pickup arm 18 free end. The compliant signal pickup holder support 32 rigidly transmits the cyclical, translatory motion of the pickup arm 18 to the signal pickup holder 31 while accommodating vertical and lateral, arcuate motion of the signal pickup 17 in the spiral groove 13. The compliant holder support 32, being located adjacent to the signal pickup 17, reduces the pickup arm unit mass which must follow the arcuate motion of the signal pickup, whereby the pickup arm unit compliance is enhanced.

The coupler 20 is secured to the pickup arm 18 end, remote from the signal pickup 17, by a compliant pickup arm support 33. The coupler 20 is releasably coupled to the support member 21. The compliant pickup arm support 33 also rigidly transmits the cyclical, translatory motion of the coupler 20 to the pickup arm 18 while decoupling the coupler (subject to engagement with the support member 21) from arcuate motion of the pickup arm.

The support member 21 has a shank portion 34 which is fixedly secured to the translatory motion imparting means 24. A first magnetic coupling element 35, made from magnetizable material (e.g., steel, etc.), is permanently affixed to the support member 21. The coupler 20 has a shaft portion 36 which is fixedly secured to the pickup arm 18 by the tubular pickup arm support 33. A second magnetic coupling element 37 made from magnetized material (e.g., permanent magnet) is permanently secured to the coupler 20. The support member 21 and the coupler 20 are made from diamagnetic material (e.g., molded plastic). The engagement of the first and second magnetic coupling elements (35 and 37) rigidly transmits the longitudinal motion of the translatory motion imparting means 24 to the pickup arm 18 via the coupler 20 during playback. It is also apparent that the support member magnetizable disc 35 and the coupler magnetized disc 37 may be interchanged and yet the coupling would be an effective operation.

Guide means are secured to the coupler 20 and the support member 21, (1) for establishing a rotational orientation of the pickup arm during engagement of the coupling elements, and (2) for prohibiting any rotational motion of the pickup arm coupler in relation to the support member about, (a) a first set of axes substantially normal to, and (b) a second axis substantially in registry with, the pickup arm 18 longitudinal axis whereby the signal pickup 17 maintains a specified attitude in the spiral groove during playback. In the preferred embodiment, a male part 38 is integrally provided with the support member 21 and has a region with a monotonously decreasing cross section. The region comprises a frustum of a pyramid. A female part 39 is integrally provided with the coupler 20 and has a complimentary cavity in which the male part region is seated when the coupling is in an assembled condition. The male part region and the female part cavity have dimensions and configuration that permit the engagement of the coupler magnetized disc 37 with the support member magnetizable disc 35 while prohibiting the rotational motion of the pickup arm coupler 20 in relation to the support member 21 during playback when the coupling is in the assembled condition. Reference may be made to the aforesaid, copending Taylor et al. application (Ser. No. 522,822) for an illustration of the coupling arrangement.

The pickup arm unit 70 is housed in a hollow casing 40 of the cartridge 25 having walls defining a protective enclosure for the pickup arm unit. The casing 40 material permits coupling of RF energizing oscillations, (1) from an oscillator of signal processing circuitry 19 to the pickup arm 18 made of conductive material, and (2) from the conductive pickup arm 18 to a detector of the signal processing circuitry. The front/lower portion of the casing 40 is inwardly offset, as illustrated in FIGS. 4 and 5, in order to enable the oscillator and the detector inductive conductor loops to be situated in close proximity with the conductive pickup arm 18. The casing 40 may be made from translucent plastic in order to, (a) facilitate inspection of the signal pickup assembly, and (b) enhance its appearance. The casing 40 is molded in two halves in order to facilitate, (1) manufacturing of the hollow casing, and (2) assembly of the pickup arm unit 70 in the casing. The two halves may be joined together by any suitable fastening means. In the illustrative embodiment the two halves are held together by screws 41 and nuts 42. Countersunk openings 43 are provided in the casing 40 side walls for flushly receiving the screw heads and the nuts.

Means 44, as illustrated in FIGS. 4 and 6, are provided for suspending the pickup arm unit 70 through the casing when the cartridge is not in the assembled condition. The suspending means 44 maintain the coupler 20 angular orientation and position for ready engagement with the support member 21 during the pickup arm cartridge 25 assembly in the player.

The suspending means 44 comprises a plurality of support tabs 45 secured to the coupler 20 and extending therefrom for reception in a plurality of openings 46 provided in the casing 40 side walls, as illustrated in FIGS. 5 and 6. In the preferred embodiment, a pair of tabs 45 are oppositely disposed on the coupler 20. The openings are dimensioned to accommodate the translatory motion of the coupler 20 without engagement between the tabs 45 and the casing 40 during playback when the cartridge 25 is in the assembled condition as illustrated in FIG. 6.

Clamping means 47 securely hold the pickup arm unit 70 in the casing 40 when the cartridge 25 is not in the assembled condition by urging the pickup arm 18 against an inverted V-shaped recess 48 disposed in the centering rest 49 depending downwardly from the top wall of the protective casing. As illustrated in FIG. 5 in the preferred embodiment clamping means 47 comprises a clamp 50 pivotally mounted in the casing 40. The clamp 50 has triangular end walls 51 and 52 separated by leg portions 53 and 54. The end walls 51 and 52 define a gap in which the pickup arm 18 is freely received. Extensions 55 and 56 extend outwardly from the end walls for reception in the opening 57 and 58 provided in the casing 40 side walls. The clamp is movable between (a) a first position in which leg portion 53 engages the pickup arm 18 against the centering rest 49 thereby securely holding the pickup arm unit 70 in the casing 40, and (b) a second position disengaged from the pickup arm thereby freeing the pickup arm for an engagement with a signal pickup lowering/lifting mechanism mounted in the supporting structure 22. Means 59 are employed for biasing the clamp 50 in the first position. In the preferred embodiment, the biasing means 59 are a wire spring having a first end resting against the top wall of the casing 40 and a second end secured to the clamp 50 so as to urge the clamp in the first position.

As illustrated in FIGS. 1 and 2, means 60 are mounted on the supporting structure 22 for disabling the clamping means 47 during the assembly of the pickup arm cartridge 25 in the supporting structure. In the preferred embodiment, the disabling means comprises a finger 60 mounted on the supporting structure 22 and subject to engagement with the clamp leg portion 54 during assembly of the cartridge 25 in the supporting structure 22. The movement of the cartridge 25 from the unassembled condition to the assembled condition causes the finger 60 to move the clamp 50 from the first position to the second position to free the pickup arm for engagement with the signal pickup lowering/lifting mechanism.

As illustrated in FIGS. 2 and 3, when the clamping means 47 is disengaged from the pickup arm 18 during assembly of the cartridge 25 in the supporting structure 22, the pickup arm 18 rests on a bracket 61 of the signal pickup lowering/lifting mechanism. The bracket 61 is attached to a roller 62 rotatably mounted in the cage 27 for pivotal motion thereof. Apertures 63 and 64 are provided in the casing 40 side walls to allow the bracket 61 to enter the casing for manipulating the pickup arm 18 while the cartridge 25 is in the assembled condition. During playback the bracket 61 gradually lowers the pickup arm 18 in order to permit the signal pickup 17 to engage the spiral groove 13. The rotational motion of the roller 62 is damped in order to smooth the lowering motion of the bracket 61. Actuating means are provided in the player (not shown) to cause selective rotation of the roller 62 in order to lower the pickup arm 18 for playback. The roller 62 is biased in such a manner that causes the bracket 61 to lift the pickup arm 18 away from the disc record in the absence of activation by the actuating means. The advantage in thus biasing the roller 62 is that in case of accidental inactivation of the actuating means (for example, due to power failure) the pickup arm 18 will be lifted by the bracket 61 thereby automatically disengaging the signal pickup from the disc record spiral groove 13.

As illustrated in FIGS. 4, 5, and 6, when the two halves (40a and 40b) of the protective casing 40 are joined together, openings are defined, respectively, at the rear end and bottom of the casing. The opening (designated by numeral 65 in FIG. 6) at the rear end permits the support member 21 of the translatory motion imparting means 24 to enter the casing 40 during assembly of the cartridge 25 in the player for engagement with the coupler 20 of the pickup arm unit 70. The bottom opening permits passage of other operative elements of the associated player (such as, electrical feedthrough, air dielectric capacitor, etc.) when the cartridge 25 is in the assembled condition in the manner described subsequently.

A wire loop handle 67 is pivotally mounted at the top of the casing 40 in order to facilitate the handling of the cartridge 25 during disassembly and assembly. A recess 68 is provided in the top wall of the casing 40 to enable the player user to raise the handle 67 prior to disassembly.

The cartridge casing 40 and the compartment 26 dimensions and profiles are such that the cartridge 25 is flushly received in the player cage 27 when the cartridge is in the assembled condition. In order to assemble the cartridge 25 in the player, the cartridge front end 71 is first inserted in the compartment 26 narrow portion 72. The cartridge 25 is pushed forward against a leaf spring 73 of the player until the cartridge edge 74 abuts the edge 75 of the compartment 26. The cartridge 25 is then pivoted about the front end 71 until the cartridge is snugly seated in the compartment 26. The cartridge front end 71 is beveled in order to (1) facilitate entry thereof into the compartment narrow portion 72, and (2) allow smooth pivotal motion of the cartridge 25 into the compartment 26. The cartridge 25 is then pushed backward until the cartridge edge 76 abuts the edge 77 of the compartment 26. The backward motion of the cartridge 25 causes, (1) the coupler 20 to automatically engage the support member 21, and (2) the finger 60 to engage the clamp leg portion 54 in order to disengage the clamp 50 from the pickup arm 18 thereby allowing the pickup arm to rest on the bracket 61. The cartridge 25 is held in latched position by the player leaf spring 73. During playback, the bracket 61 selectively lowers the pickup arm 18 in order to permit the signal pickup 17 to engage the spiral groove 13. When the cartridge 25 is in the assembled condition, the pickup arm unit 70 is supported, (a) at the rear end by the support member 21, and (b) at the front end by the disc record 12 during playback or by the bracket 61 otherwise. As indicated above, the casing side wall openings 46 (in which the coupler tabs 45 are seated when the cartridge is in the unassembled condition) provide sufficient clearance around the tabs so that there is no contact between the openings and the tabs when the coupler 20 is subjected to translatory motion by the translatory motion imparting means.

In order to remove the cartridge 25 from the player, the cartridge is first pushed forward by using the wire loop handle 67 against the player leaf spring 73. The forward motion of the cartridge, (1) disengages the coupler 21 from the support member 20, and (2) allows the clamp wire spring 59 to pivot the clamp 50 in order to lock the pickup arm unit 70 securely in the casing.

As indicated above, the conductive pickup arm 18 serves an electrical function as well as a mechanical supportive function. The electrical function of the pickup arm 18 will now be described with reference to FIG. 2. The free end of the conductive pickup arm is electrically connected to the signal pickup electrode by a fly lead. The conductive pickup arm 18 and the surrounding conductive cage 27 serve respectively as an inner and outer conductors of a transmission line. The transmission line is capacity end loaded at both ends: (1) at the signal pickup 17 end by a variable capacitance corresponding to the series combination comprising, (a) the varying capacitance established between the signal pickup electrode and the disc record conductive coating 15, and (b) the larger capacitance exhibited between the bottom of the conductive cage 24 and the disc record conductive coating overshadowed by the cage; and (2) at the pickup arm support 20 end by the series combination including, (a) an air dielectric capacitor 78, and (b) the voltage variable capacitor (not shown).

The air dielectric capacitor 78 includes a movable capacitor plate, suspended from the pickup arm 18, received in an air gap between a pair of fixed capacitor plates fixedly mounted to the conductive cage bottom surface 30 by an insulator post. The air dielectric capacitor 78 meets the transmission line's capacity end loading requirements without the need for a wired connection between the pickup arm 18 and the cage 27. Ability to quickly and easily remove the replaceable pickup arm cartridge from the cage is thus established. The rear portion of the casing 40 is relatively wide, as illustrated in FIGS. 4 and 5, in order to permit initial tuning adjustment of the air dielectric capacitor 78 by adjustment of the air gap defined by the pair of fixed capacitor plates.

The transmission line and the associated capacitances establish a tuned circuit with resonant frequency subject to variation as the signal pickup electrode/disc record conductive coating capacitance varies. The tuned circuit is excited with UHF oscillations from a fixed frequency oscillator (not shown) of the signal processing circuitry 19 enclosed in a cage compartment operating at a frequency (e.g., 915 MHz) within an ISM-allocated band. As the resonant frequency of the tuned circuit varies, the resultant amplitude variations are detected by a detector of the signal processing circuitry 19 to recover the prerecorded information. The electrical coupling between, (1) the oscillator and the transmission line, and (2) the transmission line and the detector, may take the form of the inductive conductor loops previously described. Reference may be made to the aforementioned, copending Carlson application (U.S. Pat. No. 3,872,240) for a more detailed description of the transmission line arrangement and the associated circuitry.

Thus, a pickup arm cartridge apparatus is provided for housing a fragile pickup arm unit which, (1) protects the pickup arm unit during storage and handling of the cartridge, and (2) facilitates replacement of the pickup arm unit without any manual adjustments and connections.

What is claimed is:
1. In a playback system for recovering prerecorded signals from a spirally grooved disc record by a signal pickup when relative speed is established therebetween, and the playback system including a supporting structure mounted for movement radially of the disc record, an apparatus comprising:
 1. a pickup arm cartridge subject to location in an operative position in a compartment provided in the supporting structure, the pickup arm cartridge comprising:
    A. a pickup arm unit carrying a signal pickup;
    B. a casing having walls defining a protective enclosure for the pickup arm unit, the casing having an opening through which the signal pickup may protrude; and
    C. means for releasably clamping the pickup arm unit in a retracted position in the casing, the retracted position providing a location for the signal pickup withdrawn within the confines of the casing and remote from the opening;
 2. means mounted in the supporting structure for selective lowering and lifting of the signal pickup; and
 3. means mounted in the supporting structure for disabling the clamping means as the cartridge is located in the operative position in the supporting structure compartment in order to free the pickup arm unit for engagement with the signal pickup lowering/lifting means.
2. A system as defined in claim 1 wherein the clamping means comprises:
 a clamp pivotally mounted in the casing and having a portion subject to engagement with the pickup arm, wherein the clamp is movable between (a) a first position in engagement with the pickup arm unit thereby holding the signal pickup end of the pickup arm unit in a retracted position in the cas- ing, and (b) a second position disengaged from the pickup arm in order to free the pickup arm unit for engagement with the signal pickup lowering/lifting means; and means for biasing the clamp in the first position.

3. A system as defined in claim 2 wherein the biasing means is a wire spring having a first end resting against the top wall of the casing and a second end secured to the clamp so as to urge the clamp in the first position.

4. A system as defined in claim 3 wherein the disabling means comprises a finger mounted on the supporting structure and subject to engagement with the clamp during assembly of the cartridge in the supporting structure, and wherein movement of the cartridge from the unassembled condition to the assembled condition causes the finger to move the clamp from the first position to the second position thereby disengaging the clamp from the pickup arm.

5. In a playback system for recovering prerecorded signals from a spirally grooved disc record by a signal pickup when relative speed is established therebetween, wherein it is desirable that the signal pickup maintain a specified attitude with respect to the spiral groove during playback, and wherein the playback system includes a supporting structure having a supporting member subject to translatory motion for varying the position of the signal pickup in relation to the spiral groove during playback in a manner that opposes deviations of the relative speed from a predetermined speed, an apparatus comprising:

1. a pickup arm cartridge subject to reception in a compartment provided in the supporting structure, the pickup arm cartridge comprising:
    A. a casing having walls defining a protective enclosure;
    B. a pickup arm unit including:
        a. a pickup arm carrying a signal pickup at one end thereof;
        b. a coupler secured to the pickup arm second end by a compliant pickup arm support, the coupler supporting a first magnetic coupling element of magnetizable material, the support member including a second magnetic coupling element of magnetizable material which is subject to releasable engagement with the first magnetic coupling element when the cartridge is received in the compartment, wherein at least one of the first and the second magnetic coupling elements is permanently magnetized, and wherein the engagement of the first and the second magnetic coupling elements permits rigid transmission of the translatory motion of the support member to the pickup arm via the coupler;
        c. guide means secured to the coupler and the support member for establishing a rotational orientation of the pickup arm during engagement of the coupling elements, and for maintaining the coupler angular orientation with respect to the support member when the coupling is in the engaged condition whereby the signal pickup maintains a specified attitude in the spiral groove during playback; and
        d. means for suspending the pickup arm unit within the casing, wherein the suspending means maintain the coupler angular orientation and position for ready engagement with the support member as the pickup arm cartridge is received in the compartment, wherein the suspending means comprises a plurality of support tabs secured to the coupler and extending therefrom for reception in a plurality of openings provided in the casing; and wherein the openings are dimensioned to accommodate the translatory motion of the coupler without engagement between the tabs and the casing during playback; and
    C. clamping means for releasably holding the signal pickup end of the pickup arm unit in a retracted position in the casing, the retracted position providing a location for the signal pickup withdrawn within the confines of the casing and remote from an opening in the casing through which the signal pickup may protrude; and
2. means mounted in the supporting structure for disabling the clamping means when the cartridge is received in the compartment, whereby protrusion of the signal pickup through the opening is no longer prohibited by the clamping means.

6. A system as defined in claim 5, wherein a compliant signal pickup support is interposed between the signal pickup and the pickup arm one end in order to reduce the pickup arm assembly mass which must follow the vertical and lateral movement of the signal pickup engaging the spiral groove disposed on the disc record surface.

7. A system as defined in claim 5 wherein the clamping means comprises:
    a clamp pivotally mounted in the casing and having a portion subject to engagement with the pickup arm, wherein the clamp is movable between (a) a first position in engagement with the pickup arm thereby securely holding the signal pickup end of the pickup arm unit in a retracted position in the casing, and (b) a second position disengaged from the pickup arm in order to free the pickup arm for engagement with signal pickup lowering/lifting means mounted in the supporting structure; and means for biasing the clamp in the first position.

8. A system as defined in claim 7 wherein the biasing means is a wire spring having a first end resting against the top wall of the casing and a second end secured to the clamp so as to urge the clamp in the first position.

9. A system as defined in claim 7 wherein the disabling means comprises a finger mounted on the supporting structure and subject to engagement with the clamp during assembly of the cartridge in the supporting structure, and wherein movement of the cartridge from the unassembled condition to the assembled condition causes the finger to move the clamp from the first position to the second position thereby disengaging the clamp from the pickup arm.

10. A system as defined in claim 9 wherein a centering rest depends downwardly from the top wall of the casing, and wherein the clamp urges the pickup arm against an inverted V-shaped recess disposed in the centering rest when the cartridge is not in the assembled condition thereby preventing lateral movement of the pickup arm unit in the casing.

11. A system as defined in claim 9 wherein the guide means comprise:
    a male part having one end secured to the support member and having a region remote from the one end with a monotonously decreasing cross section;
    a female part secured to the coupler and having a complimentary cavity in which the male part region is seated when the cartridge is in the assembled condition; and wherein the male part region and the female part cavity have dimensions and surface configuration that permits the engagement of the first and the second magnetic coupling elements while maintaining a specified attitude of the signal pickup with respect to the spiral groove when the cartridge is in the assembled condition.

12. A system as defined in claim 11 wherein the surface of the male part in the region comprises a frustum of a pyramid having peripheral surfaces which define at least one linear edge substantially parallel to the pickup arm longitudinal axis and wherein the female part cavity has a complimentary recess whereby the specified attitude of the signal pickup in the spiral groove during playback is achieved.

13. A system as defined in claim 12 wherein the frustum has a rectangular cross section.

* * * * *